(12) United States Patent
Igarashi

(10) Patent No.: US 7,646,411 B2
(45) Date of Patent: Jan. 12, 2010

(54) IMAGING APPARATUS

(75) Inventor: Senshu Igarashi, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 246 days.

(21) Appl. No.: 11/660,657

(22) PCT Filed: Sep. 9, 2005

(86) PCT No.: PCT/US2005/032322

§ 371 (c)(1), (2), (4) Date: Feb. 20, 2007

(87) PCT Pub. No.: WO2006/031690

PCT Pub. Date: Mar. 23, 2006

(65) Prior Publication Data

US 2008/0094493 A1  Apr. 24, 2008

(30) Foreign Application Priority Data

Sep. 10, 2004  (JP) ............... 2004-264726

(51) Int. Cl.
  *H04N 5/202* (2006.01)
  *H04N 5/235* (2006.01)
  *H04N 5/20* (2006.01)

(52) U.S. Cl. ............... 348/254; 348/229.1; 348/255; 348/230.1

(58) Field of Classification Search ............... None
See application file for complete search history.

(56) References Cited

U.S. PATENT DOCUMENTS

| | | | |
|---|---|---|---|
| 6,583,820 B1 * | 6/2003 | Hung | 348/362 |
| 7,176,965 B1 * | 2/2007 | Noguchi | 348/222.1 |
| 2002/0036697 A1 * | 3/2002 | Mori et al. | 348/229 |
| 2002/0036716 A1 * | 3/2002 | Ito et al. | 348/674 |
| 2007/0076103 A1 * | 4/2007 | Tamaru et al. | 348/254 |

FOREIGN PATENT DOCUMENTS

| | | |
|---|---|---|
| JP | 2002-084454 | 3/2002 |
| JP | 2003-87604 | 3/2003 |
| JP | 2004-23605 | 1/2004 |
| JP | 2004-120511 | 4/2004 |
| JP | 3551655 | 5/2004 |

\* cited by examiner

*Primary Examiner*—John M Villecco
*Assistant Examiner*—Wanda M Negron
(74) *Attorney, Agent, or Firm*—Peyton C. Watkins; Thomas J. Strouse

(57) ABSTRACT

To reliably obtain a captured image expected by a user, such as an image precisely showing the shades of a blue sky or a flower, or an image captured under flat illumination and having high contrast, an apparatus comprises an aperture, shutter, CCD, and an AGC, and applies gamma correction to an image signal using gamma correction values. Maximum reflectance, being an index of the amount of incident light according to the maximum output from the CCD, is increased or decreased in multiple levels depending on the subject being photographed, and the exposure amount is accordingly adjusted, thereby changing a dynamic range. A microcomputer revises the gamma correction values in response to changes in maximum reflectance so as to substantially maintain a relationship between an incident light reference amount being a reference for appropriate exposure and the corresponding gamma corrected output value.

17 Claims, 10 Drawing Sheets

IMAGING APPARATUS

FIELD OF THE INVENTION

The present invention relates to an imaging apparatus, and more particularly to a technology applied to a digital image pickup apparatus, such as a digital camera, for changing a dynamic range depending on a subject to be photographed.

BACKGROUND OF THE INVENTION

In a digital camera which obtains an image signal using an imaging element, such as a CCD, a COMS, or the like, gamma correction is applied to the image signal captured by the imaging element to thereby establish linearity on an output device (mainly, a display panel). More specifically, taking into account that a display apparatus, such as a display panel, generally has a gamma ($\gamma$) value of approximately 2, gamma correction using the reciprocal of the gamma value (which is also referred to as inverse gamma correction, but is simply referred to as "gamma correction" in this specification) is applied to an input signal to thereby linearize (establish linearity of) characteristics of an output relative to an input.

Gamma correction is generally implemented by storing gamma correction values previously computed for an input signal as a gamma correction table in a memory, such as a ROM, and referring to an address in the ROM in accordance with a value of the input signal, to thereby output, as an output signal, the gamma correction values (having been gamma corrected) stored in the corresponding address. For example, 10-bit input signal values and their corresponding 8-bit output values are prestored in the ROM, and, when an input signal value is "153", the corresponding output value of "130" is provided as an output value. Because gamma correction values are generally smaller than 1, a curve depicting outputs relative to inputs (gamma correction curve) has a convex shape which is upwardly protruded.

On the other hand, because utilization of fixed gamma correction values might introduce a phenomenon in which shadowed images are completely blacked out (rendered as a featureless block of pixels of a single color), especially in dark areas, depending on the imaged subject, a technology of modifying gamma correction values for low-brightness areas has also been suggested.

Japanese Patent Laid-Open Publication No. 2004-23605, for example, describes that detection means for detecting a signal of a high-brightness subject is provided for adjusting exposure time, to thereby prevent highlighting in an image of the high-brightness subject from being blacked out. When images are captured with such an adjusted exposure time, because the shadow of a dark subject is blacked out, the characteristics of gamma correction means are also changed to compensate for a blacked out shadow by increasing the brightness level of dark areas.

Further, Japanese Patent Laid-Open Publication No. 2003-87604 describes that, taking into account the fact that when an image signal from an CCD is adjusted in gain by an AGC, noise in a dark area (a dark noise) becomes noticeable as the gain increases, the characteristics of the gamma correction means are changed so as to reduce the brightness level of the dark areas in response to increases of the gain of the AGC.

Further, Japanese Patent No. 3551655 teaches that each histogram for R, Q and B signals is created to calculate a gamma correction coefficient in accordance with a degree of deterioration in gradation for each of the R, G, and B signals.

In the above-described conventional technologies, the blacked out shadow and the dark noise are suppressed by locally modifying gamma correction values for dark areas in the gamma correction means. However, users often wish to perform photography in a flexible and more accurate manner in consideration of the subject to be photographed. Specifically, when a user photographs a subject under automatic exposure (AE) control, for example, a blue sky which the users wishes to be clearly represented might be saturated in a captured image of the subject, or when the user photographs a flower using a macro focus mode, red might be saturated in a captured image of the flower. On the other hand, there are various user demands including, for example, a request for enhancing a contrast of a captured image whose overall brightness is low. In order to respond to such a user demand, it is necessary that a dynamic range of an imaging element, such as a CCD, or the like, be changed in accordance with the brightness of a subject to be photographed.

When only the dynamic range is simply shifted, however, a relative position of a reference amount of incident light (for example, a 18% gray level corresponding to human skin), which is used as a target for a correct exposure under automatic exposure control, in the dynamic range varies in response to the shifting of the dynamic range, which results in that a captured image will be unnatural as a whole. Even though the gamma correction values in the low-brightness area are upwardly or downwardly modified using the above-described conventional technologies, the above-described problem would not be resolved because the 18% gray level is not affected by such a modification to the gamma correction values in low-brightness areas.

SUMMARY OF THE INVENTION

Accordingly, the present invention advantageously provides an imaging apparatus capable of providing a user with a captured image expected by the user under various imaging conditions, such as an image in which the shades of blue of the sky or colors of a flower are precisely reproduced, an image which is well-defined in spite of a fact that it was photographed under flat illumination (lighting conditions which cause a captured image to be not well defined.), or the like.

In one aspect, the present invention provides an imaging apparatus which includes imaging means for applying photoelectric conversion of light from a subject and outputting the converted result as an image signal, light amount adjustment means for regulating the amount of light which enters the imaging means, gain adjustment means for controlling a gain of the image signal output from the imaging means, and correction means for applying gamma correction using gamma correction values to the image signal whose gain has been controlled in the gain adjustment means; the imaging apparatus comprising modification means in which a maximum reflectance which is an index of the amount of incident light corresponding to a maximum output of the imaging means is increasingly or decreasingly changed in a plurality of levels according to the subject, and, in response to changes in the maximum reflectance, at least either one of the light amount adjustment means and the gain adjustment means is adjusted, thereby shifting a dynamic range; and revision means which revises the gamma correction values in response to changes in the maximum reflectance so as to substantially maintain a relationship between a reference amount of incident light which is used as an index of correct exposure and its corresponding output value obtained by gamma correction.

According to the present invention, the dynamic range is shifted by increasingly or decreasingly changing the maximum reflectance in accordance with the subject, while the gamma correction values are established as variables which may be revised in response to the changes in the maximum reflectance rather than fixed values. Such a revision is implemented not by locally modifying gamma correction values in a low-brightness area, but by modifying the gamma correction values so as to substantially maintain gamma corrected output values with respect to the reference amount of incident light (for example, the amount of 18% neutral gray light) regardless of the increase or decrease in the maximum reflectance. In other words, instead of revising the gamma correction values only in the low-brightness, the gamma correction values are revise in broader areas, including the area of the reference amount of incident light (in one aspect, revised in the entire area ranging from the low-brightness area to the high-brightness area). By additionally revising the gamma correction values in accordance with the increase/decrease in the maximum reflectance in such a manner that the corresponding output value is substantially maintained with respect to the reference amount of incident light, a desirable result of capturing an image can be obtained, even when the dynamic range is shifted.

According to the present invention, an image desired or expected by a user can be captured, such as one in which blue shades of a blue sky and colors of a flower photographed under various conditions are precisely reproduced in a captured image, one in which an image captured under flat illumination is well defined, or the like.

DETAILED DESCRIPTION OF THE INVENTION

A preferred embodiment of the present invention will be described with reference to the drawings, using a digital camera as an example.

Figure 1:
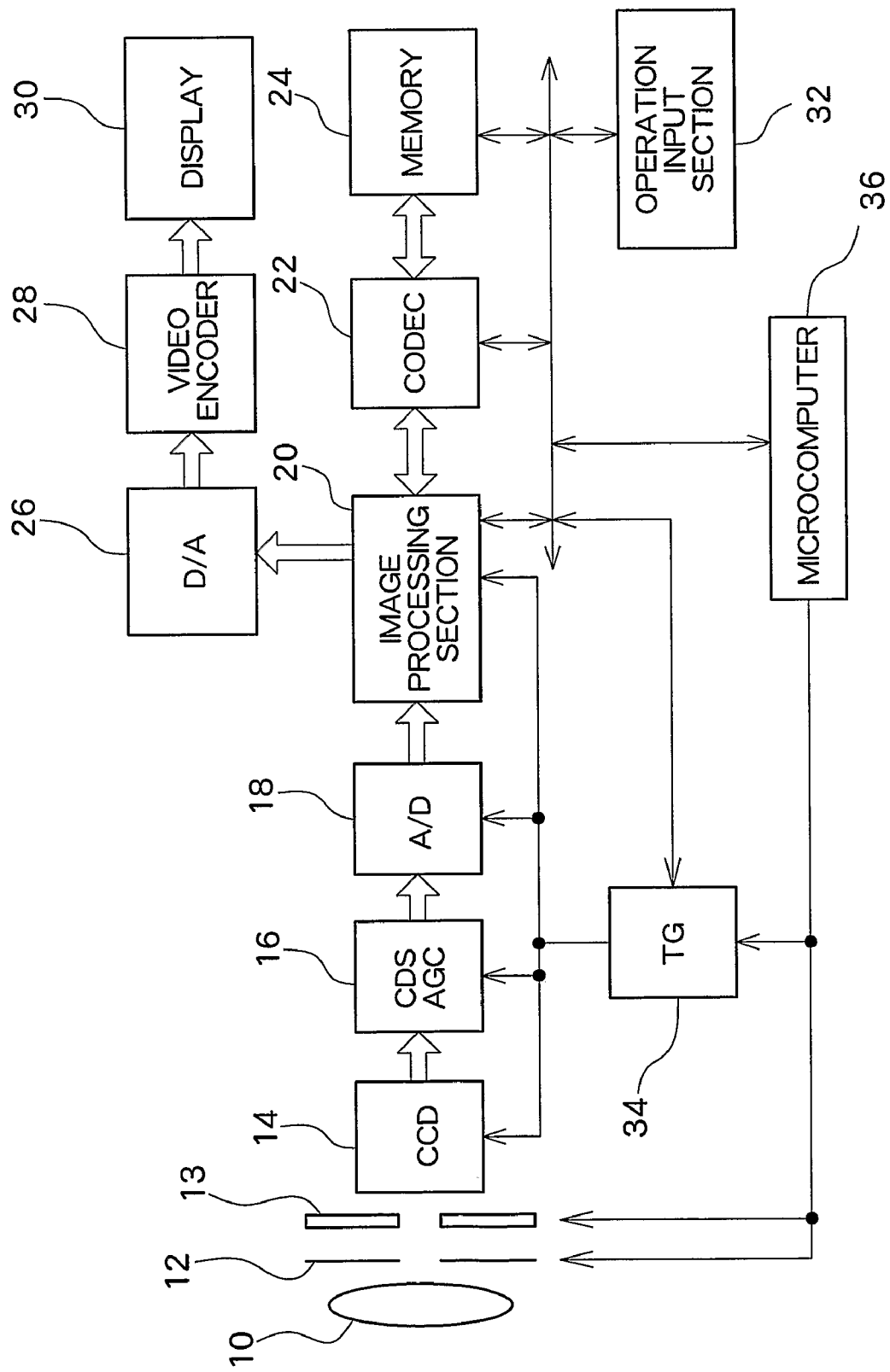
FIG. 1 is a block diagram showing a structure of a digital camera according to an embodiment of the present invention.

FIG. 1 shows a block diagram showing the overall structure of a digital camera according to an embodiment of the present invention. A lens 10 collects light from a subject. An aperture 12 and a shutter 13 adjust the amount of incident light from a subject and the time period in which light enters from the subject, respectively. Alternatively, the time period for incident light can also be adjusted by controlling the time for accumulating a charge in a CCD 14 based on a drive signal from a timing generator TG 34, which will be described below (an electronic shutter), rather than providing the mechanical shutter 13. Also, both the mechanical shutter 13 and an electronic shutter may be provided. The light which is collected and whose amount is adjusted through the lens 10, the aperture 12, and the shutter 13, enters the CCD 14 which functions as an imaging element. The CCD 14 converts the incident light into an electric signal (a voltage signal) in accordance with the light amount thereof and outputs the resultant signal. Here, a CMOS may be used in place of the CCD 14. The CCD 14 outputs the electric signal obtained by photoelectric conversion to a CDS (Correlation Double Sampling)/AGC (Auto Gain Control) 16, which samples the electric signal supplied from the CCD 14 and adjusts the signal level (gain) thereof for output to an A/D 18. The A/D 18 converts the analog signal supplied from the CDS/AGC 16 into a digital signal and outputs the digital signal to an image processing section 20. The image processing section 20, which is formed by a system LSI, applies a signal processing to an input digital signal and outputs the processed signal to a CODEC 22 or a D/A 26.

Figure 2:
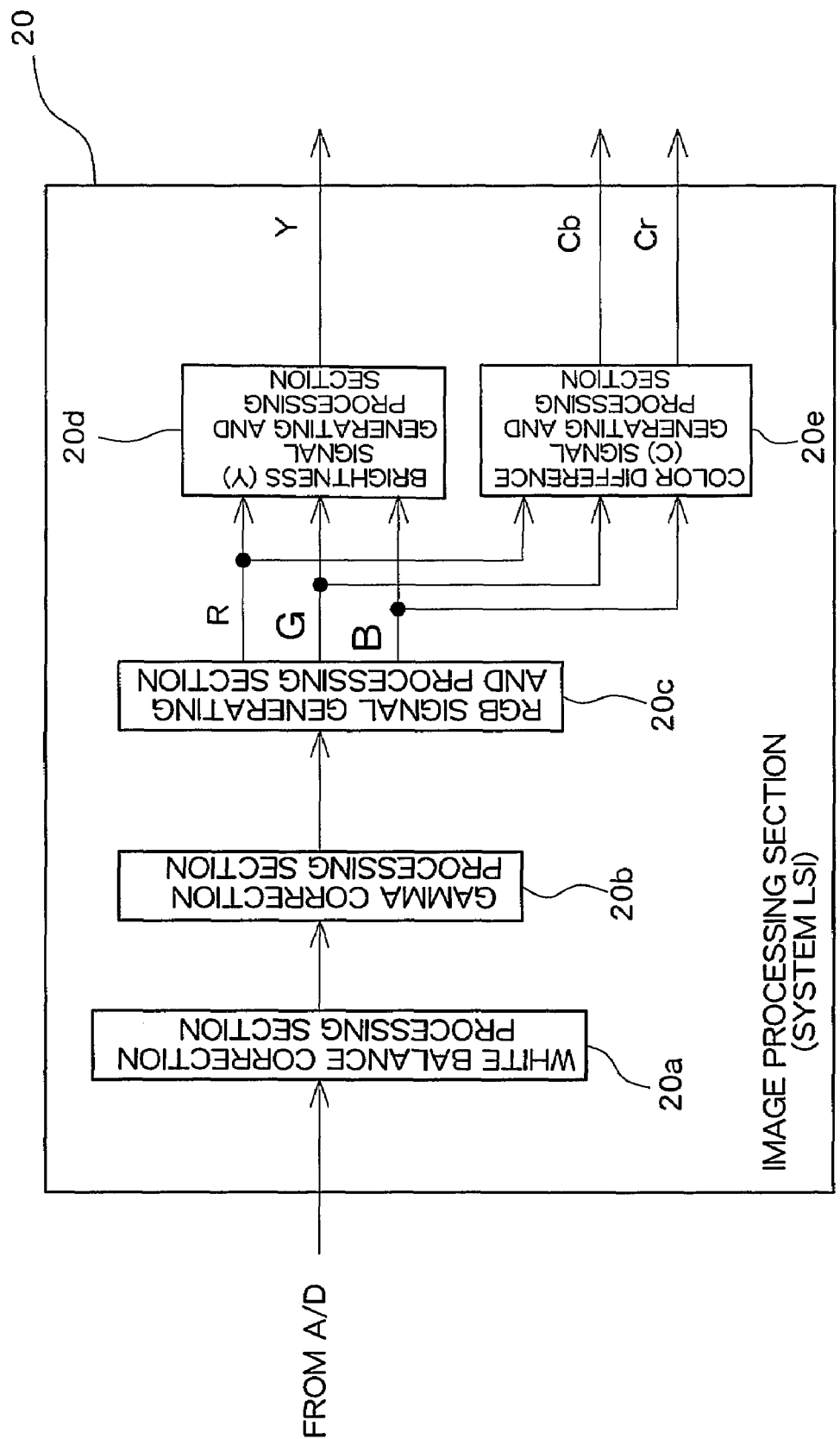
FIG. 2 is a block diagram showing a function of an image processing section in FIG. 1.

The image processing section 20 will be described. FIG. 2 is a block diagram outlining a function of the image processing section 20. The image processing section 20 sequentially applies white-balance correction, gamma ($\gamma$) correction, and separation between a color signal and a brightness signal, to the digital signal (the digital image signal) supplied from the A/D 18.

A white-balance correction processing section 20a corrects balance of each color in the digital image signal supplied from the A/D 18 based, for example, on a difference in the sensitivity of each of color filters provided on the CCD 14, and outputs the corrected image signal to a gamma correction processing section 20b. The gamma correction processing section 20b applies gamma correction to the image signal whose white-balance has been corrected. Specifically, the gamma correction processing section 20b exponentially converts an output value with respect to an input value so as to correspond to the characteristics of a display device, thereby establishing linearity. More specifically, the gamma correction is performed in such a manner that a relationship between an input value and an output value is stored, as a map, in a memory and an output value corresponding to an input value is obtained by accessing the map. An intermediate value which is not defined in the map is obtained by interpolation using adjacent values (values adjacent to the target value on both sides). It is also possible to store a gamma correction function, not a map, in a memory and perform conversion using this correction function. In this embodiment, as will be described below, a plurality of maps, rather than a single map, are prestored in the memory and switched in response to changes of the dynamic range for use. Although the example described below uses three maps, four or more maps may be used as appropriate. The gamma correction processing section 20b outputs the digital image signal which has been subjected to gamma correction to an RGB signal generating and processing section 20c. The RGB signal generating and processing section 20c applies a noise removal process, a band limiting process, a high-pass signal correction process, and the like, to the digital image signal to generate an R signal, a G signal, and a B signal, and outputs the signals to a brightness signal generating and processing section 20d and a color difference signal generating and processing section 20e. The brightness signal generating and processing section 20d combines the RGB signals supplied from the RGB signal generating and processing section 20c at a predetermined combination ratio to generate a brightness signal (a Y signal). Similarly, the color difference signal generating and processing section 20e combines the RGB signals supplied from the RGB signal generating and processing section 20c at a predetermined combination ratio to generate a color difference signal (Cb, Cr). These brightness signal and the color difference signal are supplied to the CODEC 22 or the D/A 26, as described above.

Referring again to FIG. 1, the CODEC 22 compresses and encodes the image signal supplied from the image processing section 20 and stores the resultant signal in the memory 24, or decodes the encoded image data read from the memory 24 and supplies the resultant signal to the image processing section 20. The memory 24 is formed, for example, by a flash memory, and stores image data which is compressed and encoded by the CODEC 22, such as image data which is compressed and encoded in JPEG format or TIFF format. A D/A 26 converts the image signal supplied from the image processing section 20 into an analog image signal and outputs the analog image signal to a video encoder 28. The video encoder 28 encodes the analog image signal in the form of a video signal (NTSC signal or the like) which is adaptable to a display 30 and outputs the signal to the display 30. The display 30 is formed by a liquid crystal panel, an organic EL panel, and the like, and displays the image signal supplied from the video encoder 28. The display 30 functions as a finder or an image monitor of the digital camera.

An operation input section 32 is an operation switch through which a user of the digital camera designates various commands or menus including the shutter operation or selection of a subject or a scene, and outputs various command signals in accordance with user operations to a microcomputer 36 (micon) or the image processing section 20 via a bus. The timing generator TG 34 controls the operation timing of the CCD 14, the CDS/AGC 16, the A/D 18, and the image processing section 20. Under the control of the timing generator TG, an image signal is stored in a built-in memory (not shown) in the image processing section 20 at a fixed frame rate. The image signal stored in the built-in memory is reduced to a predetermined image size by a thinning process, and is displayed on the display 30 which serves as a finder via the D/A 26 and the video encoder 28. When a shutter button, which is one type of the operation input section 32, is operated by a user, the timing generator TG 34 controls the image processing section 20 to capture an image signal at the time point when the shutter button is depressed, such that an image signal stored in the built-in memory of the image processing section 20 at the corresponding timing is compressed and encoded by the CODEC 22 and stored in the memory 24. Alternatively, an image signal corresponding to the timing when the shutter is depressed is read from the built-in memory of the image processing section 20 and displayed, via the D/A 26 and the video encoder 28, on the display 30 which serves as a finder or a liquid crystal monitor. The user views the display screen for visual recognition and evaluation of the photographed image.

The microcomputer (micon) 36 collectively controls the aperture 12, the shutter 13, the AGC function of the CDS/AGC 16, the timing generator TG 34, and the image processing section 20. Specifically, the micon 36 adjusts the aperture 12, the shutter 13, the electronic shutter, and the AGC 16 for adjusting an exposure amount based on a shutter operation signal, various command signals, or menu selection signals which are input from the operation input section 32, and also controls write and read of image data to and from the memory 24 and display of the image data on the display 30. In addition, in order to encourage or assist the user's operation of the operation input section 32, the micon 36 causes the display 30 to display predetermined various operation menus and the current status (the number of images which can be photographed, the shutter speed, the aperture value, the setting mode, the histogram, or the like). The operation input section 32 in this embodiment is equipped with a "maximum reflectance selector switch" used for manually changing the dynamic range (or latitude).

Figure 3:
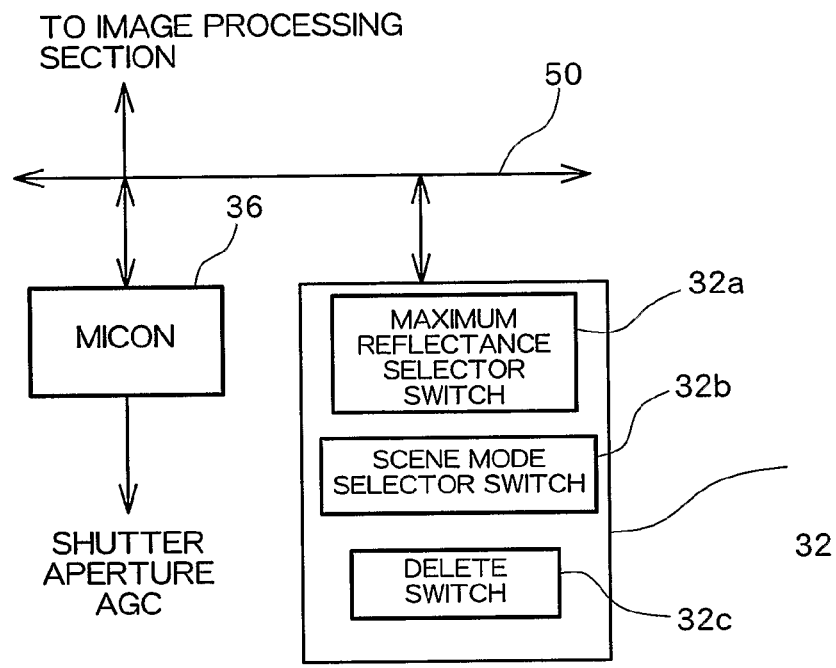
FIG. 3 is a block diagram showing a function of an operation input section in FIG. 1.

FIG. 3 shows a functional block diagram of the operation input section 32 in FIG. 1. The operation input section 32 comprises the maximum reflectance selector switch (SW) 32a, a scene mode selector switch SW32b, and a delete switch SW32c in addition to components usually included as a typical function in a digital camera, such as a power supply switch, a shutter button, a menu selection switch, a captured image readout selection switch, and other elements.

The maximum reflectance selector switch 32a is operated by a user to increase or decrease the maximum reflectance of the subject and, in this embodiment, is configured to have three selectable levels of 70%, 120%, and 170%. Here, it should be noted that the "maximum reflectance" is an index of the amount of incident light corresponding to a maximum output of the CCD 14. According to the CIPA (Camera & Imaging Products Association) standards, an intermediate tone level is adopted as a reference level of sensitivity. In other words, a reference is established at a brightness value (a Y value which is 118 in terms of 8 bit) corresponding to a 18% standard neutral gray subject when the maximum digital output value (which is 255 in terms of 8 bit) having been gamma-corrected is correlated with the subject reflectance of 100%. It should be appreciated that the brightness value for the 18% gray subject may be assigned to another value, such as 130, for example, rather than the value of 118 according to the CIPA standards, and may be determined depending on how human skin is represented. When the brightness value for the 18% gray subject is specified, a reflectance corresponding to the maximum digital output value, i.e. the maximum reflectance, is defined by the following formula:

Maximum output value(%)=18(%)×maximum *CCD* output value/*CCD* output value for 18% gray subject captured under correct exposure conditions In this embodiment, the brightness of the 18% gray subject is set to 130 (in terms of 8 bit) after gamma correction and the maximum reflectance is set to 120% by default. In this default state, the CCD 14 outputs an image signal in accordance with the amount of incident light at reflectance of from 0% to 120%. When a subject is photographed with the default setting, the brightness of the subject is high enough to potentially pose problems of blacked out highlights, shades of blue (with a result of whitish sky), red (with a result of causing a red color to become whitish), or the like. Further, there is another problem that contrast of the subject is low in an image of the subject captured under flat illumination (for example, when the subject is photographed in a photography studio). The problems result from a dynamic range inappropriately defined at the reflectance of from 0% to 120% with respect to photographing conditions, and therefore can be prevented by increasing or decreasing the maximum reflectance from 120% of the default to thereby establish the dynamic range which fits for photographing conditions. A user can change the maximum reflectance from 120% of the default to 170% to thereby shift the dynamic range to a higher brightness side at the time of photographing outdoors under a clear sky, or change the maximum reflectance from 120% of the default to 70% to thereby shift the dynamic range to a lower brightness side at the time of photographing under flat illumination.

The modification achieved by simply increasing or decreasing the maximum reflectance while leaving the gamma correction values unchanged yields a result that the gamma corrected output value for the 18% gray subject being the target for correct exposure would vary in accordance with the increase/decrease of the maximum reflectance (because an increase in the maximum reflectance causes the 18% gray to become smaller relatively in the dynamic range and an decrease in the maximum reflectance causes the 18% gray to become larger relatively in the dynamic range, with the result of variations in the gamma corrected output value). Consequently, results expected by a user cannot be obtained, thereby requiring the user to download the captured image to a PC (personal computer) or the like and perform additional separate operations, such as correcting a tone curve using image processing software, or the like. Therefore, in this embodiment, in addition to increasingly or decreasingly changing the maximum reflectance, the gamma correction values are dynamically revised in response to the increase/decrease of maximum reflectance to thereby provide the user with a captured image matching the user's visual impression, as described further below. Data on the maximum reflectance specified through the maximum reflectance selector switch 32a is supplied via the bus to the micon 36.

The scene mode selector switch 32b is a switch to select a scene to be photographed, and is configured to allow selection of scene modes including, for example, a flower mode (or macro focus mode), a portrait mode, a landscape mode, and the like. The scene mode selected using the scene mode selector switch 32b is supplied via the bus 50 to the micon 36.

The delete switch 32c is a switch used for deleting a captured image from the memory 24. The captured image is provided from the image processing section 20 and displayed via the D/A 26 and the video encoder 28 on the display 30 as described above. After visually recognizing the captured image viewed on the display 30, the user can operate the delete switch 32c when they are not satisfied with the captured image. According to an operation result of the delete switch 32c, the micon 36 and the image processing section 20 delete the captured image stored in the memory 24. The delete switch 32c according to this embodiment has, in addition to the function which allows the user to simply delete a specific captured image, a function of allowing the user to perform selective input of a reason for deletion of the image. More specifically, when a user attempts to delete a certain captured image, the micon 36 and the image processing section 20 list reasons for deletion on the display 30 to thereby prompt the user to input a selected one of the reasons for deletion. The one of the reasons for deletion specified using the delete switch 32c is supplied via the bus 50 to the micon 36.

According to the signals sent from the maximum reflectance selector switch 32a, the scene mode selector switch 32b, and the delete switch 32c, the micon 36 adjusts at least one or any combination of the aperture 12 and the shutter 13 (and the electronic shutter) to establish the exposure amount of the CCD 14 in accordance with the maximum reflectance and instructs the image processing section 20 to change (revise) the gamma correction values in response to changes in the maximum reflectance. When the maximum reflectance is changed from 120% of the default to 170% using the maximum reflectance selector switch 32a, the micon 36 performs adjustments for increasing the number of aperture stops of the aperture 12, enhancing the shutter speed of the shutter 13, and decreasing the gain of the AGC 16. On the other hand, when the maximum reflectance is changed from 120% of the default to 70%, the micon 36 performs adjustments for decreasing the number of aperture stops of the aperture 12, slowing down the shutter speed of the shutter 13, and increasing the gain of the AGC 16. Alternatively, it is possible to use anther adjustment algorithm in which only the aperture 12 and the shutter 13 are primarily adjusted, and the gain of the AGC 16 is additionally adjusted only when the adjustment is not sufficient. When an "aperture priority" mode or a "shutter priority" mode is specified by a user, the aperture 12 and the shutter 13 are adjusted according to the requirements for the specified mode.

On the other hand, when a particular scene mode is specified using the scene mode selector switch 32b, or when a specific reason for deletion is specified using the delete switch 32c, the micon 36 interprets the particular scene mode or the specific reason for deletion in connection with the maximum reflectance and adjusts the aperture 12, the shutter 13, and the AGC 16 to thereby regulate the exposure amount just as achieved when the maximum reflectance selector switch 32a is operated. The behavior of interpreting the scene mode in connection with the maximum reflectance means that the micon 36 regards the setting of a specific scene mode as an equivalent of a specific setting of the maximum reflectance. Specifically, when the flower mode or the macro focus mode is specified, for example, the micon 36 determines that the maximum reflectance is set to 170%. Similarly, interpreting the reason for deletion in connection with the maximum reflectance describes that the micon 36 regards specification of the specific reason for deletion as an equivalent of a specific setting of the maximum reflectance. In other words, when a reason for deletion "blue of the sky is saturated" is specified, the micon 36 determines that the maximum reflectance is set to 170%. Correlations between the scene modes and the maximum reflectances and between the reasons for deletion and the maximum reflectances are prestored in the ROM of the micon 36. Therefore, referring to the ROM, the micon 36 specifies the maximum reflectance at a value corresponding to the scene mode or the reason for deletion, and then adjusts the exposure amount while instructing the image processing section 20 to change the gamma correction values as achieved when the maximum reflectance is specified using the maximum reflectance selector switch 32a. If all of the maximum reflectance selector switch 32a, the scene mode selector switch 32b, and the delete switch 32c are operated together, and the maximum reflectances indicated by the switches conflict with each other, the micon 36 assigns priorities to the switches and adopts the setting specified by one of the switches based on the priority. For example, if the maximum reflectance is set to 170% using the maximum reflectance selector switch 32a and the scene mode is set to the equivalent to the maximum reflectance of 70% using the scene mode selector switch 32b, the micon 36 assigns a higher priority to the maximum reflectance selector switch 32a and adjusts the exposure amount to a value corresponding to the maximum reflectance of 170% in addition to issuing an instruction to change the gamma correction values.

Figure 4:
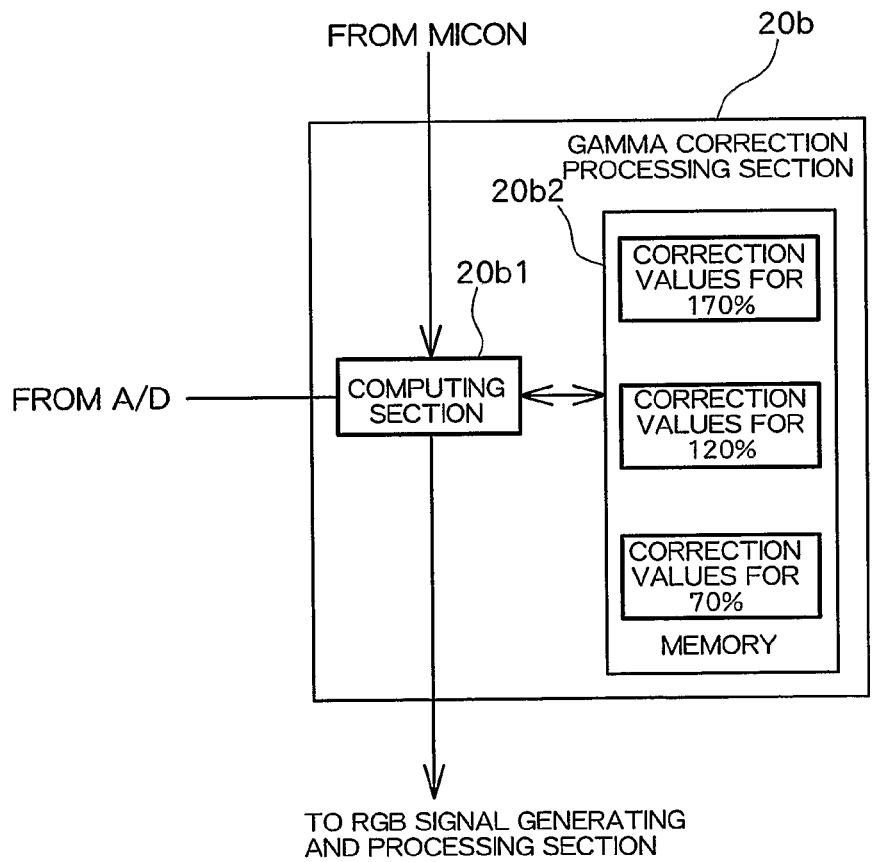
FIG. 4 is a block diagram showing a gamma correction processing section in FIG. 2.

FIG. 4 shows a functional block diagram of a gamma correction processing section 20b installed in the image processing section 20. The gamma correction processing section 20b includes a computing section 20b1 and a memory 20b2 in which a plurality of gamma correction value maps are stored.

Upon receipt of the instruction to revise gamma correction values (gamma correction value revision instruction) from the micon 36, the computing section 20b1 makes access to the memory 20b2 to retrieve a gamma correction value map corresponding to the maximum reflectance, applies gamma correction using the gamma correction values defined in the retrieved gamma correction value map to the digital image signal from the A/D 18, and outputs the resultant signal to the RGB signal generating and processing section 20c.

The memory 20b2 stores three gamma correction value maps for 170%, 120%, and 70%. The gamma correction value maps specify gamma corrected output values corresponding to input values. The gamma correction map for 120% is the default, and the computing section 20b1 applies gamma correction using the gamma correction value map for 120% to the input values by default. When the maximum reflectance of 170% is specified, according to the instruction from the micon 36, the computing section 20b2 applies gamma correction using the gamma correction value map for 170% to the input values. Similarly, when the maximum reflectance of 70% is specified, according to the instruction from the micon 36, the computing section 20b2 applies gamma correction using the gamma correction value map for 70% to the input values. The gamma corrected output values corresponding to input values are supplied from the gamma correction value maps, whereas a gamma corrected output value corresponding to an input value which is an undefined intermediate value is provided by performing interpolation using values adjacent to the target value on both sides. Although the gamma correction value maps are stored in the memory 20b2, a function which treats an input value as a variable may be stored instead of the gamma correction value maps. The gamma correction value maps for 170%, 120%, and 70% are created according to a predetermine regulation. Specifically, the gamma correction value map for 120% is used as the reference, and the other gamma correction value maps are defined by modifying gamma correction values for 120% such that the gamma corrected output value for the 18% gray subject is left unchanged in the gamma correction value maps for 170% and 70% corresponding to the maximum reflectances set to 170% and 70%, respectively.

A method for setting gamma correction values for each maximum reflectance according to this embodiment will be described below.

Figure 5:
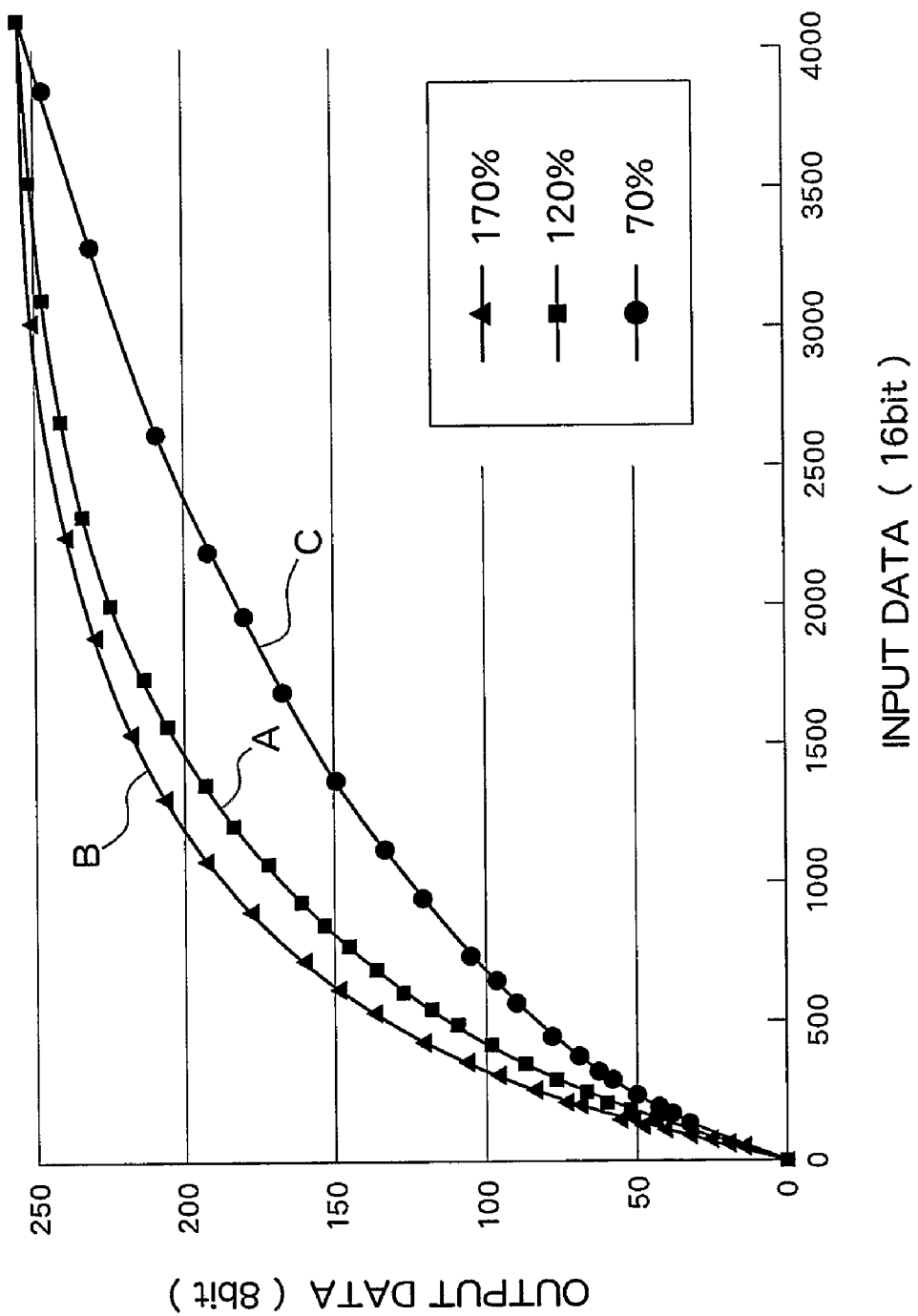
FIG. 5 is a graph representing gamma correction value maps for 120%, 170%, and 70% maximum reflectances according to the embodiment of the present invention.

FIG. 5 shows a graph representing the gamma correction value maps for 170%, 120%, and 70% shown in FIG. 4. In FIG. 5, the abscissa plots digital input values (16 bit), and the ordinate plots gamma corrected output values (8 bit). In addition, solid line A represents the gamma correction values for 120% used as the reference, solid line B represents the gamma correction values for 170%, and solid line C represents the gamma correction values for 70%. The gamma correction values for 170% are shifted upward on the whole relative to the gamma correction values for 120% (i.e. in a direction of increasing the output values), and the gamma correction values for 70% are shifted downward on the whole relative to the gamma correction values for 120% (i.e. in a direction of decreasing the output values). Also, it can be said that the gamma correction values for 170% are changed so as to make resultant gamma values smaller (approach zero), and the gamma correction values for 70% are changed so as to make resultant gamma values greater (approach 1).

Figure 6:
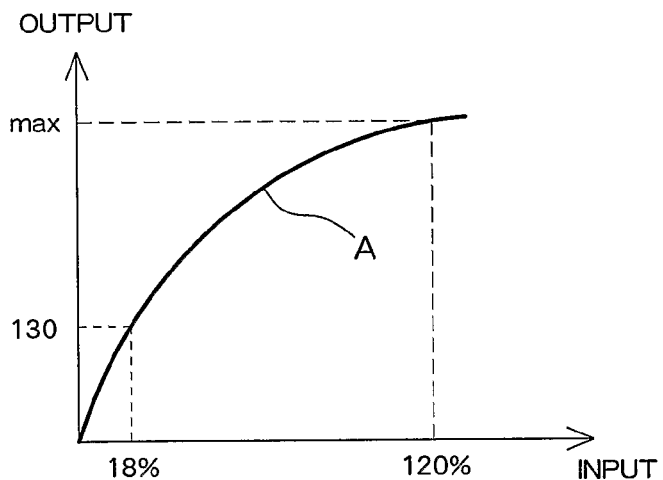
FIG. 6 is an explanatory view of gamma correction values for the maximum reflectance of 120%.
Figure 7:
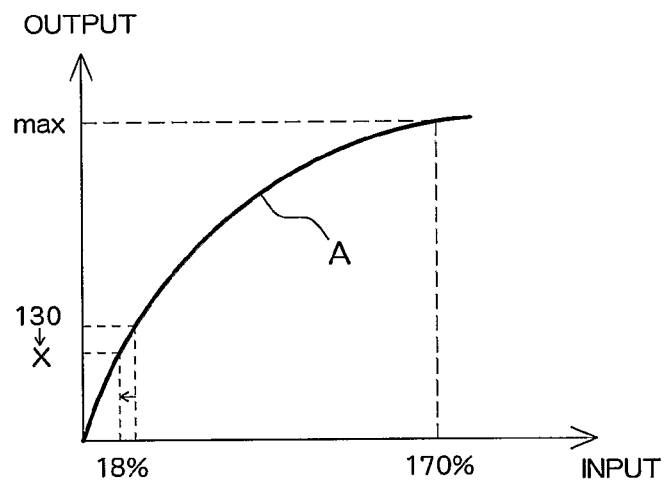
FIG. 7 is a view for explaining the setting of gamma correction values for the maximum reflectance of 170%.
Figure 8:
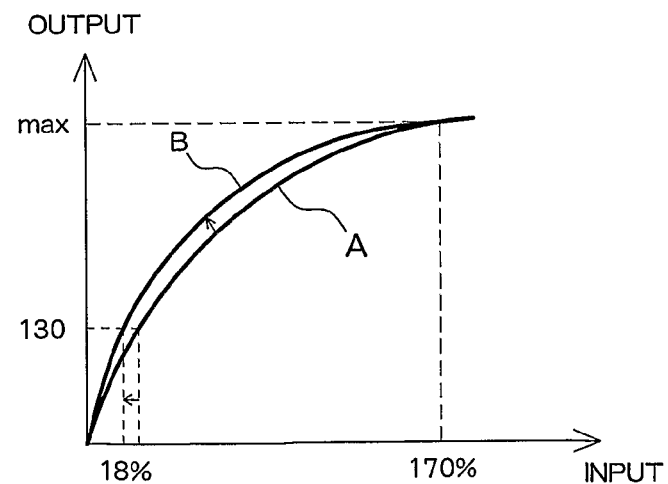
FIG. 8 is a view for explaining the setting of gamma correction values for the maximum reflectance of 170%.

FIGS. 6 to 10 schematically depict how the gamma correction values illustrated in FIG. 5 are established. FIGS. 6, 7, and 8 depict the generation of the gamma correction values for 170% from those for 120%. FIG. 6 shows a graph of the gamma correction values for 120% in which the output value for the 18% gray subject becomes a predetermined value (130 in this embodiment) and the maximum CCD output value (max) corresponds to 120% reflectance. Here, when the maximum reflectance is changed from 120% to 170% as shown in FIG. 7, a relative position of the 18% gray in an input value range is descended (shifted to a low brightness side) due to the increase of the maximum reflectance to 170%, thereby shifting the output value for the 18% gray downward from the intrinsic value of 130 to value X as long as the gamma correction value is left unchanged. Because the output value for the 18% gray is set to 130 with the intent of ensuring the correct exposure, downward shifting from 130 of the output value for the 18% gray will cause the captured image to become underexposed as a whole. Therefore, in response to changes in the relative position of the 18% gray caused by changing the maximum reflectance from 120% to 170%, the gamma correction values are increased in such a manner that the output value for the 18% gray is kept at 130 which is the output value for the 18% gray in the case of 120%, as shown in FIG. 8, to thereby obtain the gamma correction values for 170%. It should be noted that because the gamma correction values are changed so as to make the output value for 18% gray become 130, the gamma correction values are changed across the overall brightness area including a low brightness area, an intermediate brightness area, and a high-brightness area.

Figure 9:
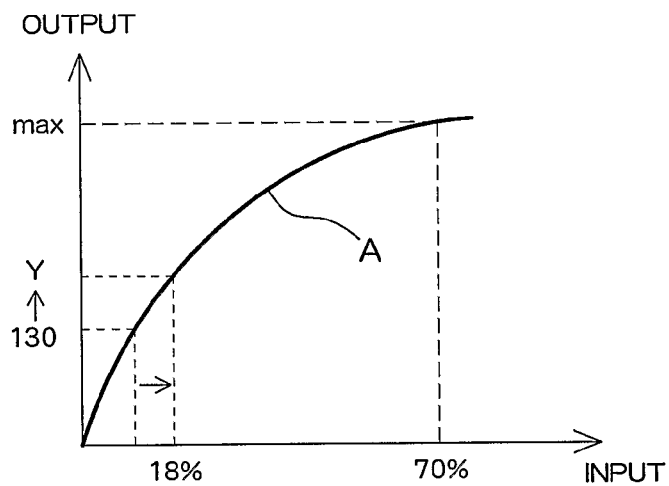
FIG. 9 is a view for explaining the setting of gamma correction values for the maximum reflectance of 70%.
Figure 10:
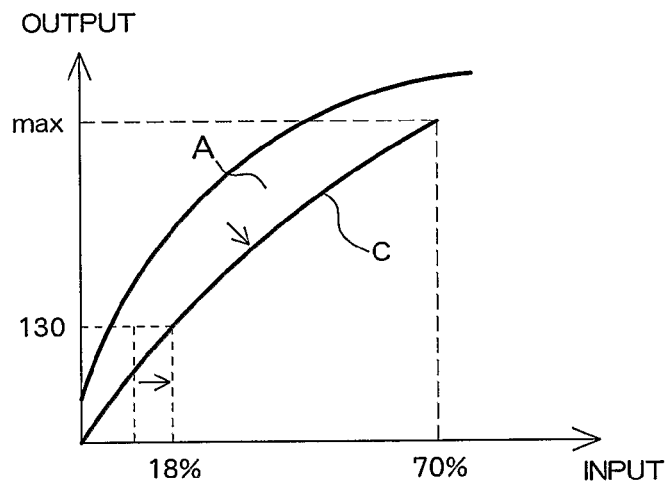
FIG. 10 is a view for explaining the setting of gamma correction values for the maximum reflectance of 70%.
Figure 11:
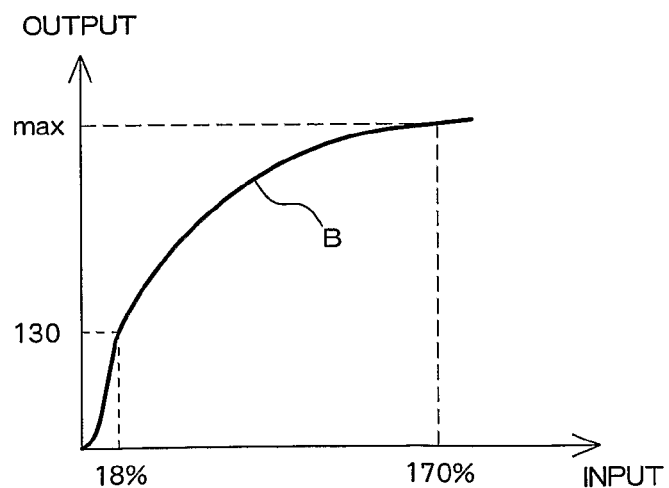
FIG. 11 is a graph representing another set of gamma correction values for the maximum reflectance of 170%.

FIGS. 9 and 10 depict the generation of the gamma correction values for 70% from those for 120%. When the maximum reflectance is changed from 120% to 70% as shown in FIG. 9, a relative position of the 18% gray in the input value range is increased (shifted to a high brightness side) due to the decrease of the maximum reflectance to 70%, thereby shifting the output value for the 18% gray upward from the intrinsic value of 130 to value Y as long as the gamma correction value is left unchanged. Because the output values for the 18% gray is set to 130 basically for ensuring correct exposure, upward shifting from 130 of the output value for the 18% gray subject will cause the captured image to become an overexposed image as a whole. Therefore, in response to changes in the relative position of the 18% gray caused by changing the maximum reflectance from 120% to 70%, the gamma correction values are pulled down in such a manner that the output value for the 18% gray is kept at 130 which is the output value for the 18% gray in the case of 120% (i.e. in a manner for causing resulting gamma values to approach 1), as shown in FIG. 10, to thereby obtain the gamma correction values for 70%. It should be noted that, because the gamma correction values are changed so as to make the output value for 18% gray become 130, the gamma correction values are changed across the overall brightness area including a low brightness area, an intermediate brightness area, and a high brightness area.

As described above, in addition to changing the maximum reflectance from 120% to 170% or from 120% to 70% to shift the dynamic range, the gamma correction values are revised in response to changes in the maximum reflectance so as to maintain the output value for the 18% gray which is the target for correct exposure, so that a desirable captured image can be obtained. Specifically, under circumstances where the blue of the clear sky during daytime would be saturated, or where a red color of a flower photographed in the flower mode would be saturated, by changing the maximum reflectance to 170% and accordingly revising the gamma correction values to those for 170%, it becomes possible to obtain clear captured images in which white, blue, or red color is not saturated and the correct exposure for human skin is ensured. Further, under circumstances where contract is insufficiently low due to flat illumination, by changing the maximum reflectance to 70% and accordingly revising the gamma correction values to those for 70%, a well-defined image which has high contrast and in which shadow is not blacked out can be captured.

Because the gamma correction values are modified so as to be raised upward relative to the gamma correction values for 120% when the maximum reflectance is changed from 120% to 170%, there is a possibility that noise, especially noise in a dark area (dark noise), will become noticeable. To prevent the possibility, the gamma correction values for 170% may be obtained by, in addition to making a modification to match the output value for 18% gray with 130, further shifting the gamma correction values in the low brightness area downward, so that the curve representing the gamma correction values takes the shape of the letter S as a whole.

Figure 12:
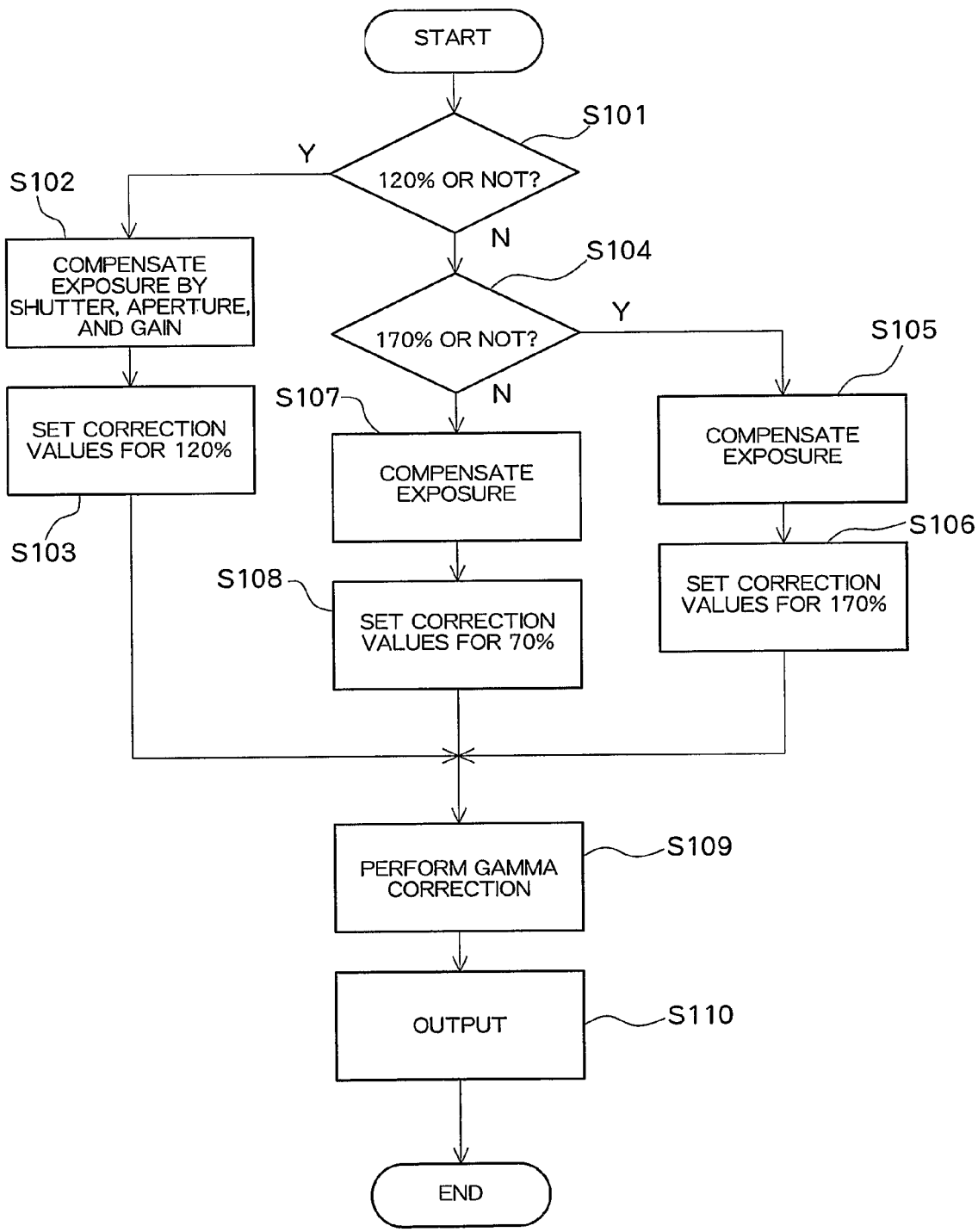
FIG. 12 is a flowchart of a process in an example wherein a maximum reflectance selector switch is used.

FIG. 12 shows a flowchart of a process in which the maximum reflectance selector switch 32a according to the present embodiment is operated. The micon 36 determines whether or not the maximum reflectance selector switch 32a is at a default setting of 120% (S101). When the maximum reflectance selector switch 32a is set to 120% (even when the selector switch remains in its default state without being operated after the power is turned on), the micon 36 adjusts the aperture 12, the shutter 13, or the gain of the AGC 16 such that the maximum output value of the CCD 14 matches 120% reflectance, to thereby regulate the exposure amount (S102). Then, responding to an instruction from the micon 36, the gamma correction processing section 20b in the image processing section 20 reads the gamma correction value map for 120% from the memory 20b2, and loads and sets the map into a working memory (S103).

When the maximum reflectance is not 120%, on the other hand, the micon 36 determines whether or not the maximum reflectance selector switch 32a is set to 170% (S104). When the maximum reflectance selector switch 32a is set to 170%, the micon 36 adjusts the aperture 12, the shutter 13, or the gain of the AGC 16 such that the maximum output value of the CCD 14 matches 170% reflectance, to thereby regulate the exposure amount of the CCD 14 (S105). Then, upon receipt of the instruction from the micon 36, the gamma correction processing section 20b in the image processing section 20 reads and sets the gamma correction value map for 170% from the memory 20b2 (S106). When the maximum reflectance is neither 120% nor 170%, the micon 36 recognizes that the maximum reflectance is set to 70%, and adjusts the aperture 12, the shutter 13, or the gain of the AGC 15 such that the maximum output value of the CCD 14 matches 70% reflectance, to thereby regulate the exposure amount of the CCD 14 (S107). Then, upon receipt of the instruction from the micon 36, the gamma correction processing section 20b in the image processing section 20 reads and sets the gamma correction value map for 70% from the memory 20b2 (S108).

After setting the gamma correction values in accordance with the maximum reflectance, the gamma correction processing section 20b in the image processing section 20 applies gamma correction to the input values using the set gamma correction values (S109) and outputs the gamma corrected values to the RGB signal generating and processing section 20C provided at the subsequent state (S110).

Figure 13:
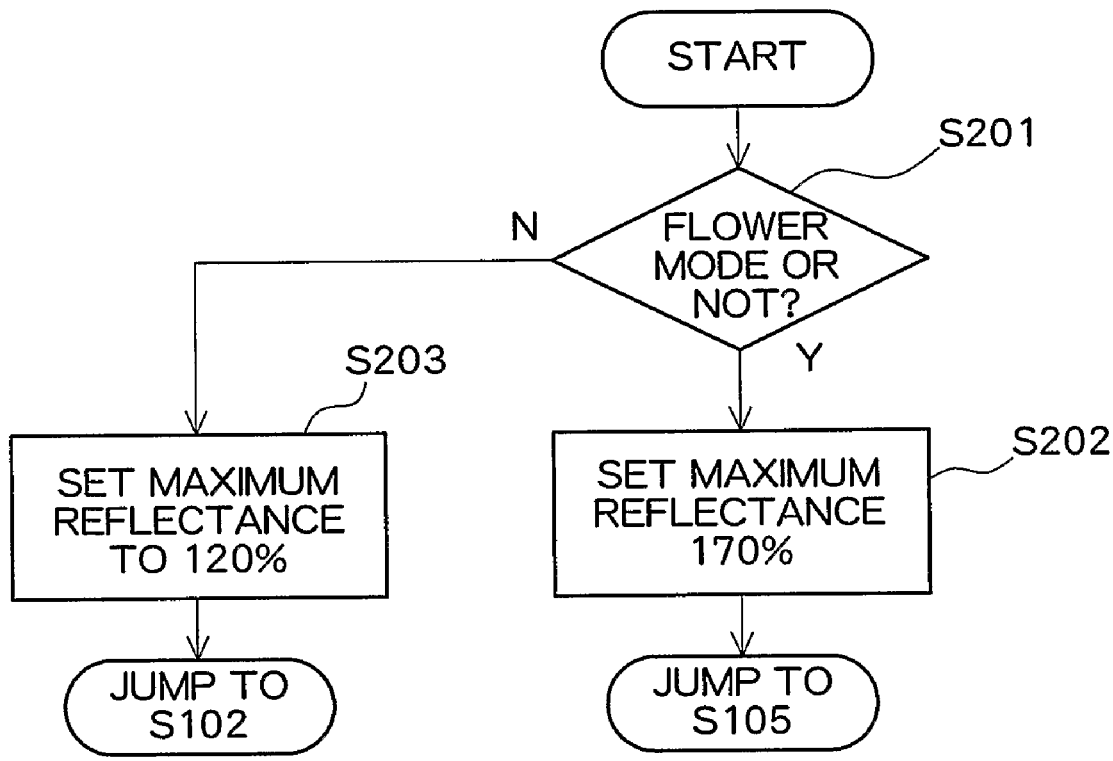
FIG. 13 is a flowchart of a process in an example wherein a scene mode selector switch is used.

FIG. 13 shows a flowchart of a process in which the scene mode selector switch 32b is operated. The micon 36 determines whether or not the scene mode is set to the flower mode (flower photographing mode) (S201). Because, in the flower mode, there is a risk that the color of a flower of the subject will be saturated, the micon 36 automatically changes the maximum reflectance from 120% to 170% (S202), and then performs process steps as shown in FIG. 12, from the step S105 onward. On the other hand, when the scene mode is set to a mode other than the flower mode, the micon 36 sets the maximum reflectance to a default of 120% (S203), and then performs process steps S102 onward, as shown in FIG. 12. A user relatively conversant in camera handling is likely to operate the maximum reflectance selector switch 32a for manually changing the maximum reflectance with the intention of modifying the dynamic range or latitude, whereas a novice user might not understand the functionality of "changing the maximum reflectance". Even such a novice user can obtain a desired result of photographing because the maximum reflectance is changed in an indirect manner by simply switching the scene mode.

Figure 14:
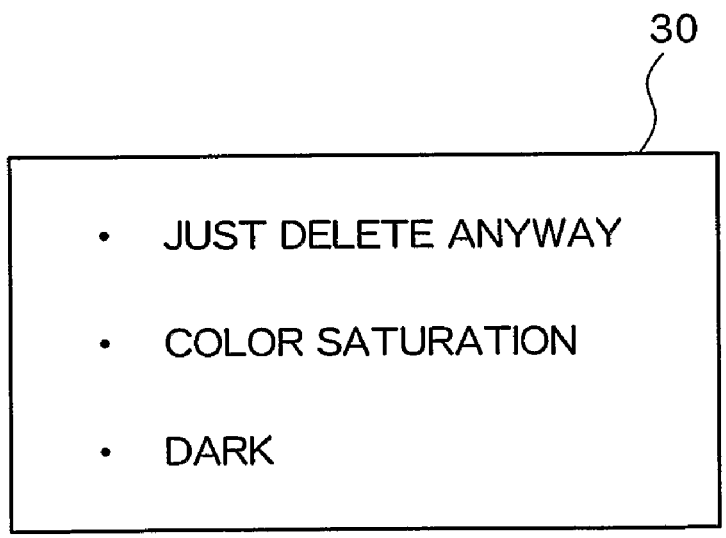
FIG. 14 is a view for explaining a display screen on which reasons for deletion are listed.

FIG. 14 shows a list of reasons for deletion which appears on the display 30 when the deletion switch 32c is operated. Responding to the user's operation, the micon 36 and the image processing section 20 display the captured image stored in the memory 24 on the display 30, and delete the displayed captured image from the memory 24 when the delete switch 32c is operated by the user. Here, the operation of the delete switch 32 triggers the micon 36 and the image processing section 20 to display the list as shown in FIG. 14 on the display 30 before actually deleting the captured image, thereby prompting the user to selectively input a reason for deletion. Although descriptions "just delete anyway", "color saturation", and "dark" are listed as the reason for deletion in FIG. 14, any reason may be included in the list. In addition to these descriptions, "blown highlight", "blacked out shadow", "insufficient contrast", "inadequate sky blue", "inadequate flower color", and the like may be contained in the list. The user can select any one of the listed reasons for deletion by operating the operation input section 32. The user might select "just delete anyway" when they wish to delete an image because of a terrible composition or the like. When a flower is photographed in, for example, the macro mode, the user might select "color saturation" when the color of the flower is saturated. Further, the user might select "dark" because of low contrast resulting from photographing under flat illumination. The micon 36 automatically sets the maximum reflectance to an appropriate value in accordance with the selected one of the reasons for deletion to improve the present setting of the maximum reflectance.

Figure 15:
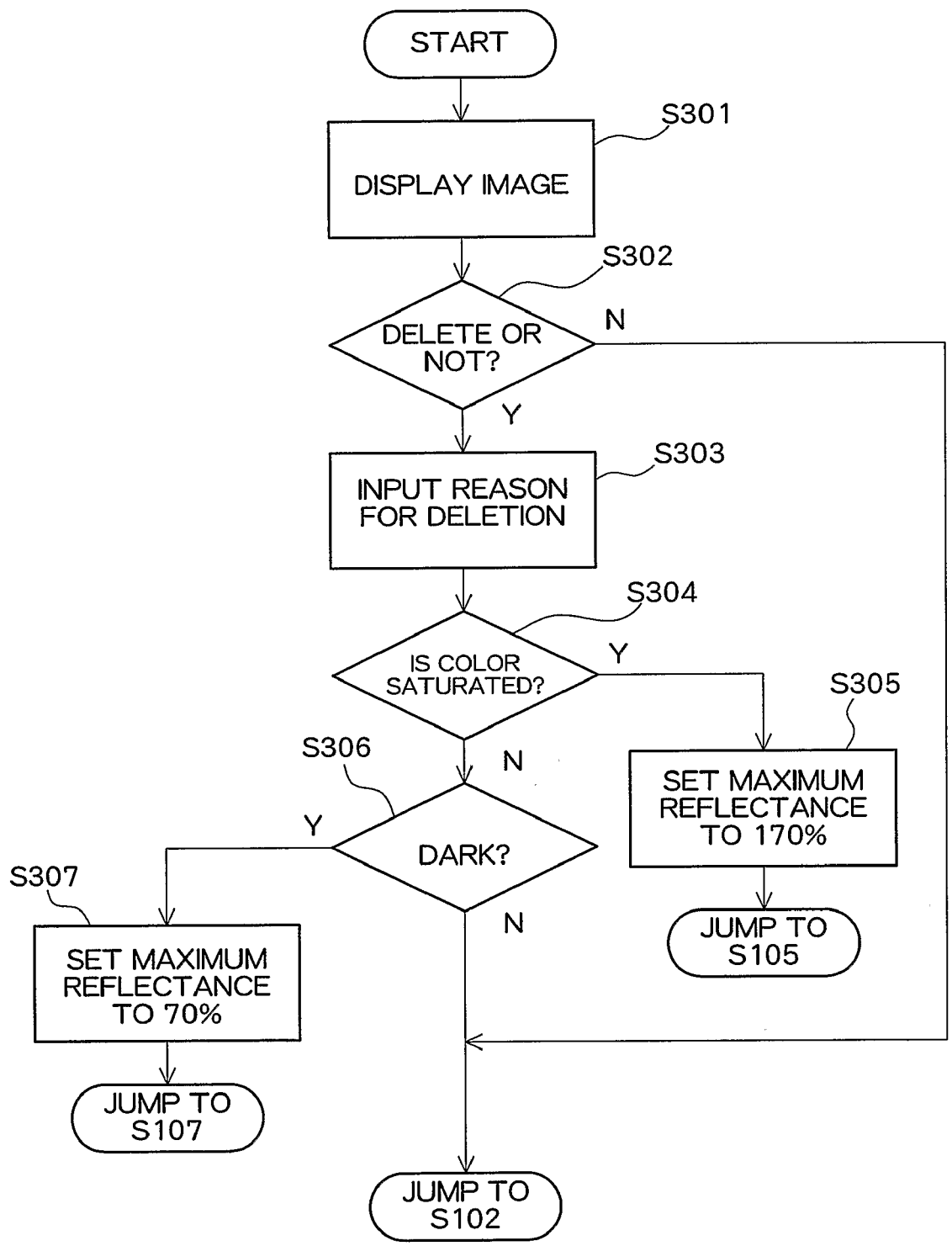
FIG. 15 is a flowchart of a process in an example wherein a delete switch is used.

FIG. 15 shows a flowchart of the above-described process. The micon 36 and the image processing section 20 read the captured image from the memory 24 (or directly output the captured image from the internal memory of the image processing section 20 when the captured image is the latest image photographed just now) and provide the obtained captured image on the display 30 (S301). Then, the micon 36 determines whether or not a delete command is input using the delete switch 32a (S302). When the delete command is input, the micon 36 lists the reasons for deletion such as those shown in FIG. 14 on the display 30 according to a control program stored in the ROM. More specifically, the micon 36 issues an instruction for displaying the reasons for deletion to the image processing section 20, and, upon receipt of the instruction, the image processing section 20 generates a text screen to display the reasons for deletion and displays the text screen on the display 30. In this state, the micon 36 enters a waiting state for user's selection input (S303). When one of the reasons for deletion is input, the micon 36 determines whether or not the selected one of the reasons for deletion is "color saturation" (S304). When selection input from the user is determined to be the "color saturation", the micon 36 sets the maximum reflectance to 170% (S305), and performs process steps S105 onward as shown in FIG. 12. On the other hand, when the reason is not "color saturation", the micon 36 determines whether or not the selected one of the reasons for deletion is "dark" (S306). When the selection input from the user is determined to be "dark", the micon 36 sets the maximum reflectance to 70% (S307) and performs process steps S107 onward as shown in FIG. 12. When a reason for deletion other than those described above is input, the micon 36 sets the maximum reflectance to 120% of the default and performs process steps S102 onward as shown in FIG. 12. In this example, it should again be noted that users do not directly change the maximum reflectance, but simply input selection of the reasons for deletion based on their impressions given from the captured image.

Although the present invention has been described in its preferred form, this invention is not limited to the specific example used to illustrate the embodiment, and various changes and modifications may be made.

For example, in addition to changing the maximum reflectance according to the user's operation of the operation input section 32, the gamma correction values are modified in response to changes in the maximum reflectance in the above-described embodiment. However, it is also possible to cause the micon 36 to automatically change the maximum reflectance and modify the gamma correction values according to the subject without the user's operation. For example, after creating a histogram of the subject, the maximum reflectance may be set to an appropriate value and the gamma correction values may be modified based on the histogram. Specifically, the micon 36 creates a brightness histogram of gamma-corrected image signals obtained by performing gamma correction using the gamma correction values (the gamma correction values for 120% set by default) then set. The histogram is created for each brightness Y and for each color (R, G, and B). Alternatively, the histogram may be created for each of colors (C, M, and Y). Further, the histograms for the colors (R, G, and B) may be created in conjunction with those for the colors (C, M, and Y). In other words, the histograms for the colors of the color filters in the CCD 14 and the histograms for their complementary colors may be created. Although, it is not simple to determine, from the histograms for the colors (R, G, and B), whether or not a Y (yellow) color, for example, is saturated, this can easily be detected by creating and using the histograms for the colors (C, M, and Y) in addition to those for (R, G, and B). Then, the micon 36 determines whether or not the created histograms satisfy the following conditions (which are provided as an example with respect to a case where the histograms for the colors (R, G, and B) are created):

(1) The number of pixels having a value of 90% or greater exceeds 15% of the total number of the pixels in one of the brightness histogram and the histograms for colors (R, G, and B).

(2) The number of pixels having a value of 98% or greater exceeds 2% of the total number of the pixels in one of the brightness histogram and the histograms for colors (R, G, and B).

When either of the above conditions is satisfied, the micon 36 changes the maximum reflectance from 120% of the default to 170% and switches the gamma correction values to those for 170%. On the other hand, when neither of the above conditions is satisfied, when the following condition:

(3) that the number of pixels having a value of 80% or greater does not exceed 2% of the total number of the pixels in all of the brightness histogram and the histograms for colors R, G, and B; is satisfied, the micon 36 changes the maximum reflectance from 120% of the default to 70% and switches the gamma correction values to those for 70%.

Figure 16:
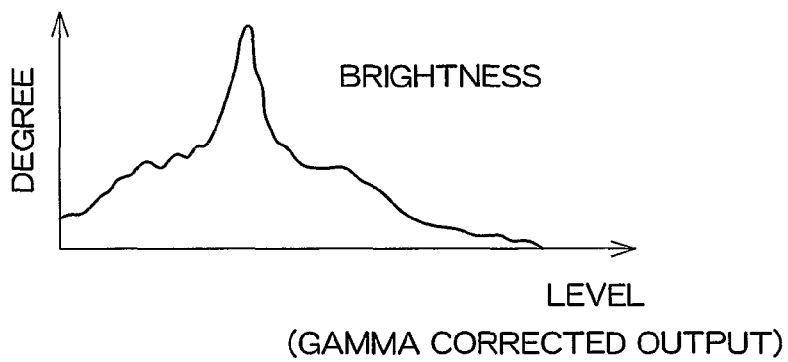
FIGS. 16(A), 16(B), 16(C), and 16(D) are histograms for the maximum reflectances of 170% and 70%.
Figure 16:
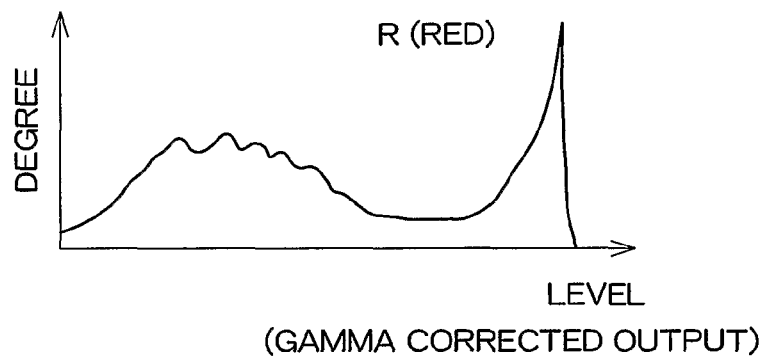
Figure 16:
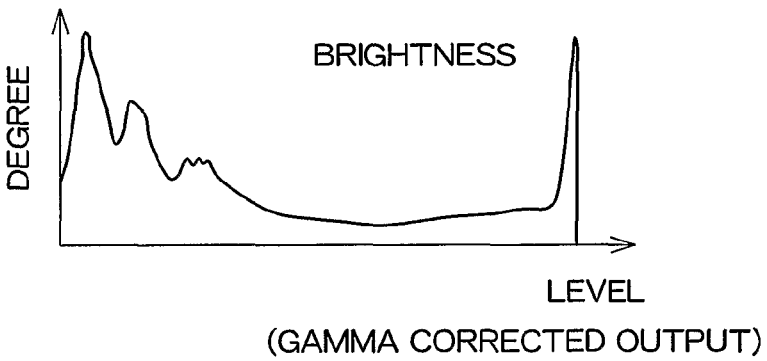
Figure 16:
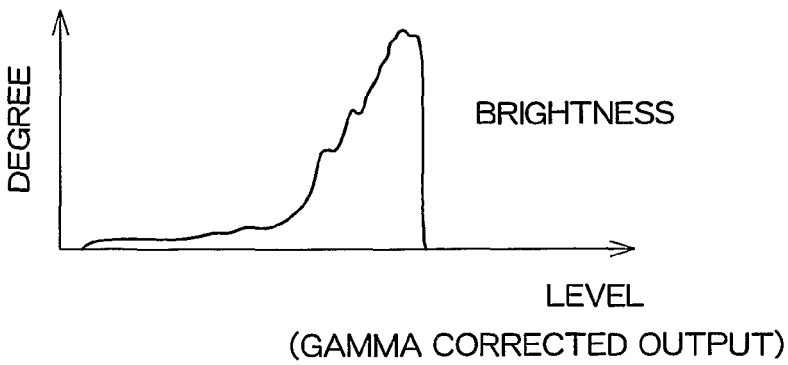

FIGS. 16(A) to 16(D) show example histograms. FIGS. 16(A) and 16(B) show examples in which the above condition (1) is satisfied in such a manner that although histogram A of an image does not satisfy the condition (1), histogram B for R (red) of the same image show that the number of pixels having a value of 90% or greater exceeds 15% of the total number of the pixels and therefore satisfies the condition. In this case, the maximum reflectance is changed from 120% to 70%. Here, it should be noted that it is not possible to detect such saturation of red using the brightness histogram alone. FIG. 16(C), on the other hand, shows an example of the brightness histogram which satisfies the above condition (2), and FIG. 16(D) shows an example of the brightness histogram which satisfies the above condition (3), with a result of changing the maximum reflectance from 120% to 70%. Any threshold value of the percentage may be specified in the above conditions (1) to (3), and the threshold value may be either a fixed value or a variable.

Further, in the present invention, the above-described embodiments may be combined as appropriate. For example, a manual/automatic operation selector switch may be provided to the operation input section 32 to achieve that switching of the selector switch to manual operation enables the maximum reflectance selector switch 32a while allowing the maximum reflectance to be changed in correlation with operation of the scene mode selector switch 32b and the reason for deletion selector switch 32c, whereas switching of the selector switch to automatic operation disables the above switches to thereby automatically change the maximum reflectance and the gamma correction values based on the histogram.

Further, although the maximum reflectance is alternately changed among three reflectances of 70%, 120%, and 170% in the above-described example, any suitable values may be specified as the maximum reflectance, such as, for example, 70%, 120%, 200%, or the like. In addition, when the maximum reflectance is a predetermined value or greater, a gamma correction value curve becomes steep in a low brightness area, which makes it especially likely that dark noise will appear. Accordingly, the output brightness value for the 18% gray subject is not necessarily matched to the value of 130 precisely, and may be substantially matched to 130 by slight downward shifting or the like. When the maximum reflectance is set to 200%, for example, the output brightness value for the 18% gray subject may be modified not to 130 but to approximately 120, or the like.

What is claimed is:
1. An imaging apparatus which includes:
imaging means for applying photoelectric conversion of light from a subject and outputting the converted result as an image signal;
light amount adjustment means for regulating the amount of light which enters the imaging means;
gain adjustment means for adjusting a gain of the image signal output from the imaging means; and
correction means for applying gamma correction using gamma correction values to the image signal whose gain has been adjusted by the gain adjustment means,
the imaging apparatus comprising:
modification means in which a maximum reflectance, being an index for the amount of incident light corresponding to a maximum output of the imaging means, is increasingly or decreasingly changed in a plurality of levels according to the subject, and, in response to changes in maximum reflectance, at least either one of the light amount adjustment means and the gain adjustment means is adjusted to thereby shift a dynamic range, and revision means which, in response to changes in the maximum reflectance made by the modification means, revises the gamma correction values so as to substantially maintain a relationship between a reference amount of incident light used as a reference for correct exposure and the corresponding output value obtained by gamma correction; wherein the modification means automatically changes the maximum reflectance based on histograms of a brightness and colors in the image signal which has been gamma corrected by the gamma correction means.

2. An imaging apparatus according to claim 1, further comprising:
memory means which stores gamma correction values corresponding to each of the maximum reflectances at the plurality of levels,
wherein, in response to changes in the maximum reflectance made by the modification means, the revision means reads the gamma correction values corresponding to the established maximum reflectance from the memory means and revises the read gamma correction values.

3. An imagines apparatus according to claim 1, wherein the modification means includes a selector switch which allows a user to manually change the maximum reflectance.

4. An imaging apparatus according to claim 3, wherein the selector switch is a switch for directly changing the maximum reflectance.

5. An imaging apparatus according to claim 3, wherein
the selector switch is a switch for changing a scene mode, and
control means which provides specification of the maximum reflectance corresponding to each scene mode to the revision means is further included.

6. An imaging apparatus according to claim 1, wherein the histograms of colors consist of a histogram of each of R, G, and B colors.

7. An imaging apparatus according to claim 1, wherein the histograms of colors consist of a histogram of each of C, M, and Y colors.

8. An imaging apparatus according to claim 1, wherein the histograms of colors consist of a histogram of each of R, G, and B colors, and C, M, and Y colors.

9. An imaging apparatus which includes:
imaging means for applying photoelectric conversion of light from a subject and outputting the converted result as an image signal;
light amount adjustment means for regulating the amount of light which enters the imaging means;
gain adjustment means for adjusting a gain of the image signal output from the imaging means; and
correction means for applying gamma correction using gamma correction values to the image signal whose gain has been adjusted by the gain adjustment means,
the imaging apparatus comprising:
modification means in which a maximum reflectance, being an index for the amount of incident light corresponding to a maximum output of the imaging means, is increasingly or decreasingly changed in a plurality of levels according to the subject, and, in response to changes in maximum reflectance, at least either one of the light amount adjustment means and the gain adjustment means is adjusted to thereby shift a dynamic range, and
revision means which, in response to changes in the maximum reflectance made by the modification means, revises the gamma correction values so as to substantially maintain a relationship between a reference amount of incident light used as a reference for correct exposure and the corresponding output value obtained by gamma correction, wherein the modification means includes a selector switch which allows a user to manually change the maximum reflectance, and wherein the selector switch is a switch for changing an image capturing condition according to a reason for deletion of a captured image,
control means which provides specification of the maximum reflectance corresponding to each reason for deletion to the modification means is further included, and
the maximum reflectance is changed according to the reason for deletion.

10. An imaging apparatus which includes:
imaging means for applying photoelectric conversion of light from a subject and outputting the converted result as an image signal;
light amount adjustment means for regulating the amount of light which enters the imaging means;
gain adjustment means for adjusting a gain of the image signal output from the imaging means; and
correction means for applying gamma correction using gamma correction values to the image signal whose gain has been adjusted by the gain adjustment means,
the imaging apparatus comprising:
modification means in which a maximum reflectance, being an index for the amount of incident light corresponding to a maximum output of the imaging means, is increasingly or decreasingly changed in a plurality of levels according to the subject, and, in response to changes in maximum reflectance, at least either one of the light amount adjustment means and the gain adjustment means is adjusted to thereby shift a dynamic range, and
revision means which, in response to changes in the maximum reflectance made by the modification means, revises the gamma correction values so as to substantially maintain a relationship between a reference amount of incident light used as a reference for correct exposure and the corresponding output value obtained by gamma correction wherein the modification means automatically changes the maximum reflectance based on a brightness histogram of the image signal, which has been gamma corrected by the gamma correction means, in such a manner that the maximum reflectance is increased as a high-brightness distribution becomes greater.

11. An imagining apparatus according to claim 10, wherein the modification means includes a selector switch which allows a user to manually change the maximum reflectance.

12. An imaging apparatus according to claim 10, wherein the selector switch is a switch for directly changing the maximum reflectance.

13. An imaging apparatus which includes:
imaging means for applying photoelectric conversion of light from a subject and outputting the converted result as an image signal;
light amount adjustment means for regulating the amount of light which enters the imaging means;
gain adjustment means for adjusting a gain of the image signal output from the imaging means; and
correction means for applying gamma correction using gamma correction values to the image signal whose gain has been adjusted by the gain adjustment means,
the imaging apparatus comprising:

modification means in which a maximum reflectance, being an index for the amount of incident light corresponding to a maximum output of the imaging means, is increasingly or decreasingly changed in a plurality of levels according to the subject, and, in response to changes in maximum reflectance, at least either one of the light amount adjustment means and the gain adjustment means is adjusted to thereby shift a dynamic range, and revision means which, in response to changes in the maximum reflectance made by the modification means, revises the gamma correction values so as to substantially maintain a relationship between a reference amount of incident light used as a reference for correct exposure and the corresponding output value obtained by gamma correction, wherein the modification means automatically changes the maximum reflectance based on a brightness histogram of the image signal, which has been gamma corrected by the gamma correction means, in such a manner that the maximum reflectance is decreased as a high-brightness distribution becomes smaller.

14. An imagining apparatus according to claim 13, wherein the modification means includes a selector switch which allows a user to manually change the maximum reflectance.

15. An imaging apparatus according to claim 14, wherein the selector switch is a switch for directly changing the maximum reflectance.

16. An imaging apparatus as in claim 13, wherein the modification means automatically changes the maximum reflectance based on a brightness histogram of the image signal, which has been gamma corrected by the gamma correction means, in such a manner that the maximum reflectance is increased as a high-brightness distribution becomes greater.

17. An imaging apparatus which includes:

imaging means for applying photoelectric conversion of light from a subject and outputting the converted result as an image signal;

light amount adjustment means for regulating the amount of light which enters the imagine means;

gain adjustment means for adjusting a gain of the image signal output from the imaging means; and correction means for applying gamma correction using gamma correction values to the image signal whose gain has been adjusted by the gain adjustment means, the imaging apparatus comprising:

modification means in which a maximum reflectance, being an index for the amount of incident light corresponding to a maximum output of the imaging means, is increasingly or decreasingly changed in a plurality of levels according to the subject, and, in response to changes in maximum reflectance, at least either one of the light amount adjustment means and the gain adjustment means is adjusted to thereby shift a dynamic range, and revision means which, in response to changes in the maximum reflectance made by the modification means, revises the gamma correction values so as to substantially maintain a relationship between a reference amount of incident light used as a reference for correct exposure and the corresponding output value obtained by gamma correction, wherein the modification means switches the maximum reflectance to one of at least three levels consisting of a first value, a second value, and a third value, wherein the first value<the second value<the third value, and the revision means, in which the gamma correction values corresponding to the maximum reflectance of the second value is used as reference, and an output value obtained by applying gamma correction using the reference gamma correction values to the reference amount of incident light are taken as A, modifies the gamma correction values corresponding to the maximum reflectance of the first value in such a manner that gamma values approach zero, to thereby yield an output value substantially equal to A when the reference amount of incident light is gamma corrected, and modifies the gamma correction values corresponding to the maximum reflectance of the third value in such a manner that gamma values approach 1, to thereby yield the output value substantially equal to A when the reference amount of incident light is gamma corrected.

* * * * *